US012710556B2

(12) United States Patent
Aldawood et al.

(10) Patent No.: US 12,710,556 B2
(45) Date of Patent: Aug. 18, 2026

(54) DETECTING NEAR-SURFACE STRUCTURES

(71) Applicant: Saudi Arabian Oil Company, Dhahran (SA)

(72) Inventors: Ali Aldawood, Safwa (SA); Mohammed Almarzoug, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 764 days.

(21) Appl. No.: 18/080,958

(22) Filed: Dec. 14, 2022

(65) Prior Publication Data

US 2024/0201406 A1 Jun. 20, 2024

(51) Int. Cl.

*G01V 1/28* (2006.01)
*G01V 1/22* (2006.01)
*G01V 1/30* (2006.01)

(52) U.S. Cl.

CPC .............. *G01V 1/288* (2013.01); *G01V 1/226* (2013.01); *G01V 1/307* (2013.01); *G01V 2210/67* (2013.01)

(58) Field of Classification Search

CPC ........ G01V 1/288; G01V 1/226; G01V 1/307; G01V 2210/67

See application file for complete search history.

(56) References Cited

U.S. PATENT DOCUMENTS 4,965,773 A * 10/1990 Marschall ............ G01V 1/3808 181/110
6,256,090 B1 * 7/2001 Chen .................... G01V 1/3835 356/73.1
9,003,888 B2 * 4/2015 Lopez ................... E21B 47/113 73/152.54
12,196,906 B2 * 1/2025 Aldawood ............. G01V 1/226
(Continued)

FOREIGN PATENT DOCUMENTS

JP 2004522949 A * 7/2004 ............. G01B 11/16
WO WO 2018222704 12/2018

OTHER PUBLICATIONS

Bakulin et al., "Seismic-while-drilling applications from the first DrillCAM trial with wireless geophones and instrumented top drive," The Leading Edge, Jun. 2020, 39(6):422-429, 8 pages.
(Continued)

*Primary Examiner* — Daniel Pihulic
(74) *Attorney, Agent, or Firm* — Dinsmore & Shohl, LLP

(57) ABSTRACT

Example methods and systems for near-surface characterization through passive monitoring of rig-generated noise are disclosed. One example method includes positioning a distributed acoustic sensing (DAS) cable in a spiral configuration layout around a drilling rig, where the drilling rig includes one or more pieces of drilling rig equipment, and the DAS cable includes a fiber-optic cable. The DAS cable is interrogated using multiple distributed fiber-optic sensing (DFOS) laser pulses during a drilling operation of the drilling rig. Multiple backscattered laser pulses are received
(Continued)

from the DAS cable after the DAS cable is interrogated using the multiple DFOS laser pulses. A respective location of each of one or more anomalies in sub-terrain around the drilling rig is determined based on the multiple backscattered laser pulses.

22 Claims, 11 Drawing Sheets

(56) References Cited

U.S. PATENT DOCUMENTS

| | | | | |
|---|---|---|---|---|
| 2003/0117895 | A1* | 6/2003 | Brandsaeter | G01V 1/46 367/81 |
| 2010/0200744 | A1* | 8/2010 | Pearce | G01V 1/226 385/13 |
| 2010/0286921 | A1* | 11/2010 | Lee | G01V 1/28 702/14 |
| 2012/0024051 | A1* | 2/2012 | Lopez | E21B 47/113 73/152.16 |
| 2017/0090054 | A1* | 3/2017 | Willis | G01V 1/42 |
| 2023/0007871 | A1* | 1/2023 | Aldawood | G01S 13/885 |
| 2024/0125964 | A1* | 4/2024 | Aldawood | G01V 1/46 |
| 2024/0201406 | A1* | 6/2024 | Aldawood | G01V 1/288 |
| 2024/0353585 | A1* | 10/2024 | Aldawood | E21B 47/001 |
| 2024/0393165 | A1* | 11/2024 | Sharma | G01H 9/004 |

OTHER PUBLICATIONS

Bakulin et al., "Smart DAS upholes for simultaneous land near-surface characterization and subsurface imaging," The Leading Edge, Dec. 2017, 36(12), 1001-1008, 8 pages.

Park et al., "Multichannel analysis of surface waves," Geophysics, May-Jun. 1999, 64(3): 800-808, 9 pages.

Mordret et al., "Ambient noise surface wave tomography to determine the shallow shear velocity structure at Valhall: depth inversion with a Neighbourhood Algorithm," Geophysical Journal International, 2014, 198(3), 1514-1525, 12 pages.

* cited by examiner

700

800

DETECTING NEAR-SURFACE STRUCTURES

TECHNICAL FIELD

The present disclosure relates to methods and systems for detecting near-surface structures.

BACKGROUND

During drilling operations, different types of drilling rig equipment, for example, engines, mud pumps, shale shakers, vehicles, and generators, can be used to assist in drilling wells. These machines can create surface vibrations that induce seismic energy, which can be recorded by sensors placed in the vicinity of the actively drilled well. However, the data recorded from these vibration sources are usually considered as noise during the data processing phase after the acquisition of seismic-while-drilling (SWD) datasets. SWD uses a drill bit traversing through the subsurface as the seismic source, while surface rig-generated noise is considered as noise when SWD datasets are processed.

SUMMARY

The present disclosure involves methods and systems for near-surface characterization through passive monitoring of rig-generated noise. One example method includes positioning a distributed acoustic sensing (DAS) cable in a spiral configuration layout around a drilling rig, where the drilling rig includes one or more pieces of drilling rig equipment, and the DAS cable includes a fiber-optic cable. The DAS cable is interrogated using multiple distributed fiber-optic sensing (DFOS) laser pulses during a drilling operation of the drilling rig. Multiple backscattered laser pulses are received from the DAS cable after the DAS cable is interrogated using the multiple DFOS laser pulses. A respective location of each of one or more anomalies in sub-terrain around the drilling rig is determined based on the multiple backscattered laser pulses.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

Figure 1:
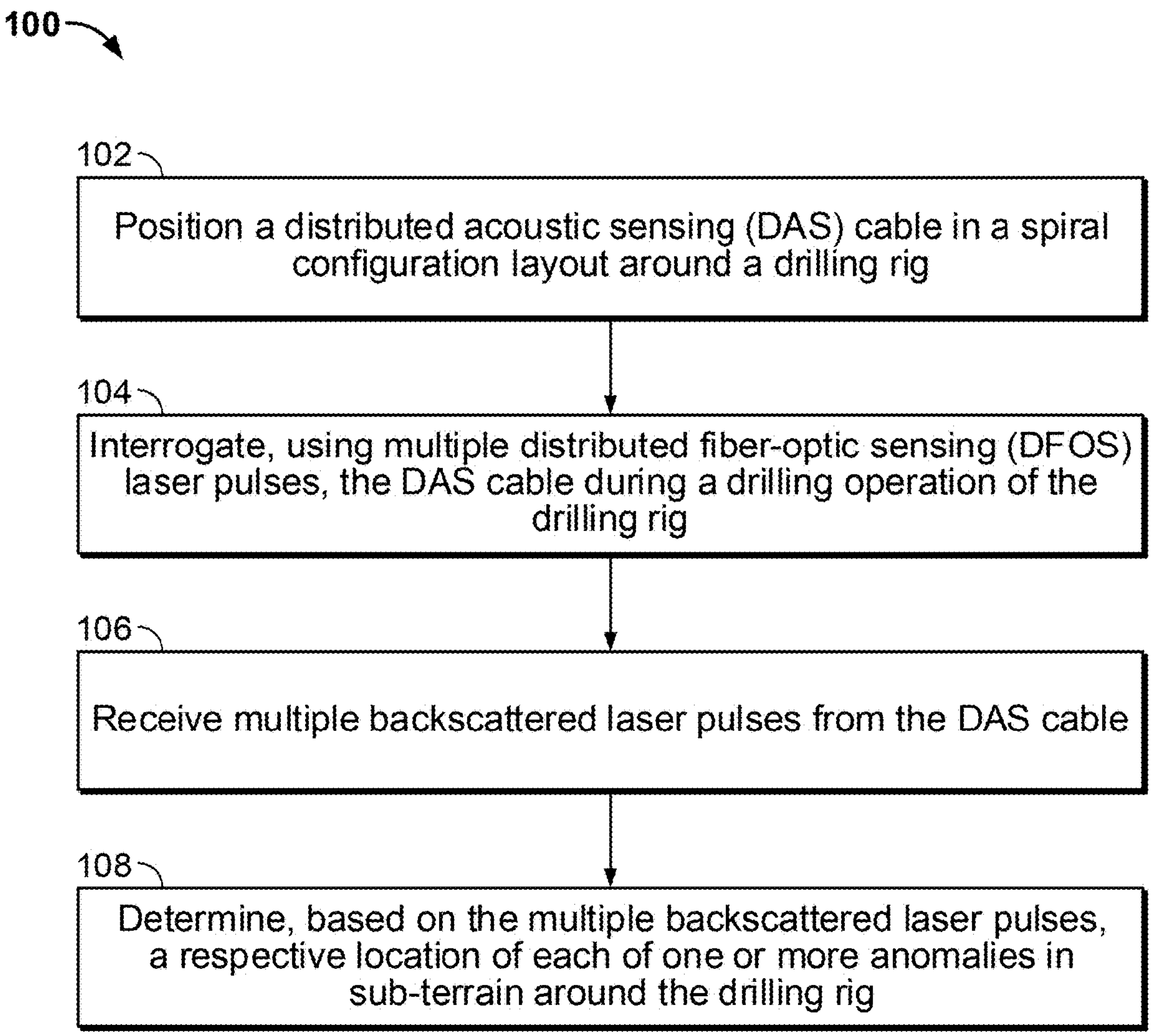
FIG. 1 illustrates an example flowchart of near-surface characterization through passive monitoring of rig-generated noise.

This specification relates to near-surface characterization through passive monitoring of rig-generated noise. The surface rig-generated noise in SWD records is seismic waves that have low dominant frequency and propagate in the near-surface sub-terrain. Surface waves can propagate just below the surface and their distortion and backscattering can reveal information about the near-surface geology. In some implementations, the analysis of wavefront distortion of surface waves can be performed by visualizing the data from seismic energy sensors as time slices where each time slice can show the wave propagation at a specific time, emanated from a surface source. This analysis can provide information of when the wavefront was distorted or backscattered and the size of the geological feature in the near-surface geology causing the distortion or backscattering.

Surface waves can also be used to generate a velocity model of the near-surface. Surface waves can be dispersive as they travel at different velocities at different frequencies. Therefore an analysis of the velocity of surface waves can show the correlation between frequency and propagation velocity. During dispersion, high-frequency energy can propagate in near-surface sub-terrain as the earth can attenuate high-frequency energy rapidly. On the other hand, low-frequency energy can propagate through deeper sub-surface layers, sampling and providing information about the deeper subsurface geology.

Distributed acoustic sensing (DAS) has the capability to record seismic signals using fiber optic cables, which are used as acoustic-wave receivers. In comparison with conventional geophones, DAS cables can continuously record the wavefield with fine spatial sampling. DAS cables can also be extended to cover larger offsets during acquisition. DAS cables can allow for setting different spacing intervals of receiver stations by controlling the gauge length parameter. In some implementations, DAS cable is mostly sensitive to waves traveling along the cable and this sensitivity decreases as the waves travel in a direction perpendicular to the cable.

A DAS cable in a spiral configuration layout can be positioned around a drilling rig to record seismic waves with offset and azimuthal information and to monitor and analyze surface waves for distortion of wavefront associated with geological features or anomalies representing drilling hazards, for example, karsts, cavities, or faults. Additionally, multichannel analysis of surface waves (MASW) can be used to invert surface waves recorded by the DAS cable to reconstruct subsurface velocity models of the near-surface sub-terrain around the drilling rig. The spiral orientation of the DAS cable can be used to provide offset-varying and azimuthal velocity information of the near-surface sub-terrain around the drilling rig. The offset of a point on the DAS cable with respect to the drilling rig can be the distance between the drilling rig and the point on the DAS cable.

FIG. 1 illustrates an example flowchart 100 of near-surface characterization through passive monitoring of rig-generated noise. At 102, a DAS cable is positioned in an acquisition geometry, for example, in a spiral configuration layout, around a drilling rig. In some implementations, the DAS cable can be trenched under the ground surrounding the drilling dig to ensure that the DAS cable couples with the earth. The vibrations from the drilling rig equipment during drilling operations can be used as a passive seismic source. The DAS cable around the drilling rig and the drilling rig equipment can record the seismic energy originated from the vibrations of the drilling rig equipment during drilling operations using a fiber-optic cable that can be used as an array of acoustic-wave receivers.

Figure 2:
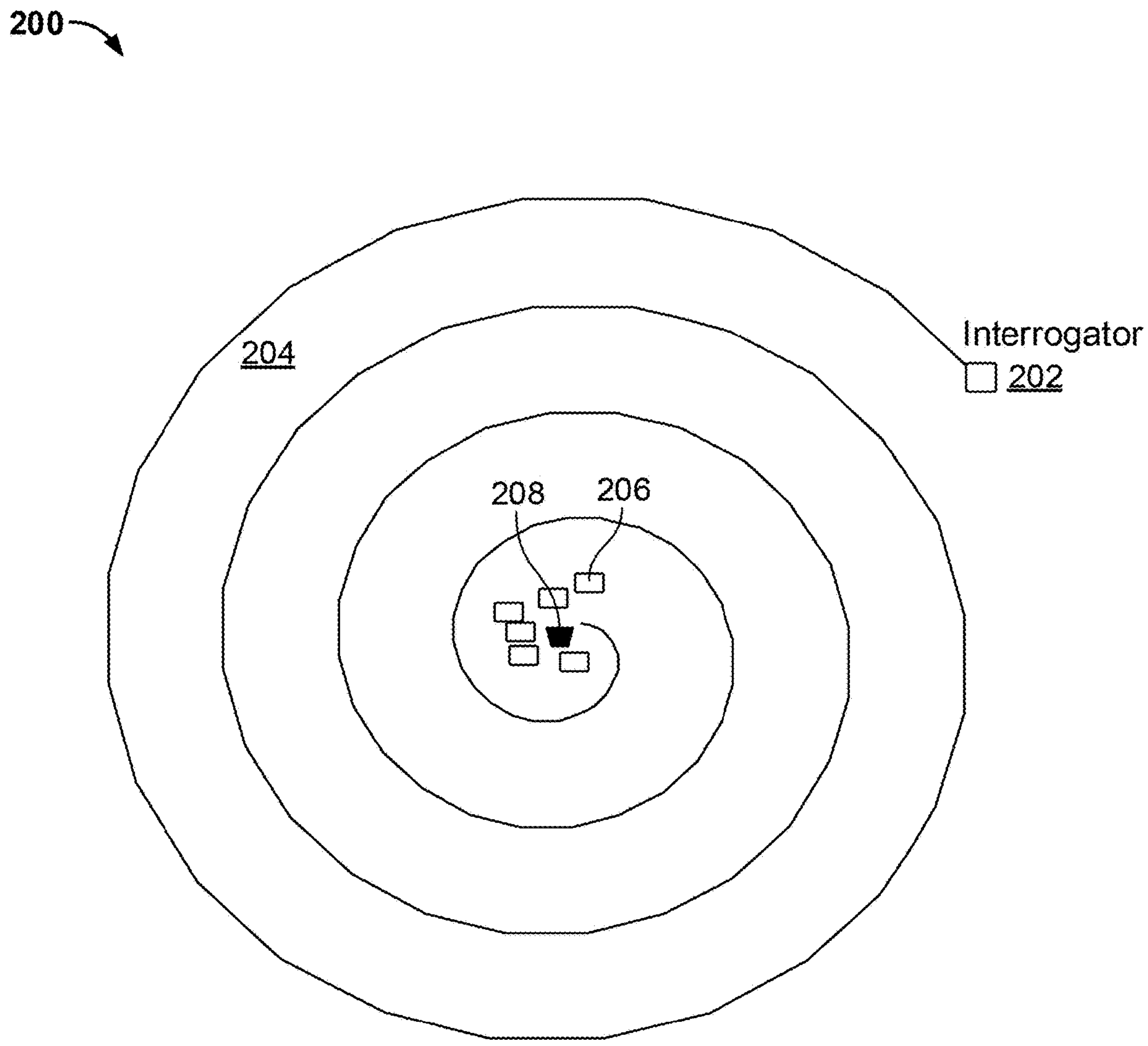
FIG. 2 illustrates an example of an acquisition geometry of a distributed acoustic sensing (DAS) cable around a drilling rig and its associated equipment.

FIG. 2 illustrates an example 200 of an acquisition geometry of a DAS cable around a drilling rig and its associated equipment. The trapezoid in the middle of the acquisition geometry correspond to drilling rig 208. Drilling rig equipment 206 used in drilling operations that present the sources of seismic energy is represented by the boxes in FIG. 2. Fiber optic cable 204 that records the seismic energy is shown in the spiral configuration layout. Fiber optic cable 204 is oriented in a spiral configuration and connected to interrogator 202 that can interrogate fiber optic cable 204 by emitting distributed fiber-optic sensing (DFOS) laser pulses into fiber optic cable 204.

Figure 3:
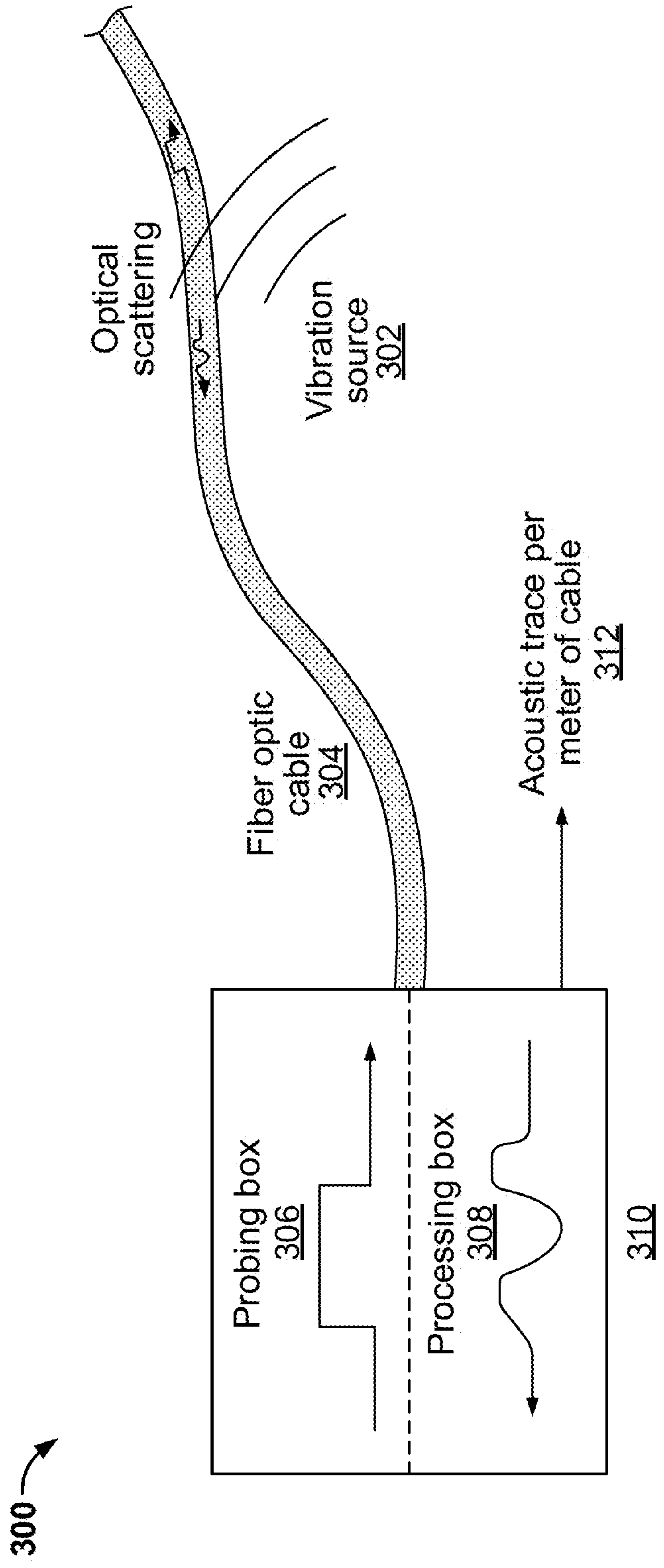
FIG. 3 illustrates an example of a schematic diagram of a system used for acquiring and processing seismic energy recorded by a DAS cable.

At 104, the DAS cable is interrogated by an interrogator that emits DFOS laser pulses into the DAS cable. FIG. 3 illustrates an example of a schematic diagram 300 of a system used for acquiring and processing seismic energy recorded by a DAS cable. As shown in FIG. 3, the DAS cable is fiber optic cable 304 and is connected to a DAS interrogation box 310 that includes a probing box 306 and a processing box 308. DAS interrogation box 310 can be interrogator 202 in FIG. 2. Probing box 306 emits laser pulses into fiber optic cable 304 to interrogate the cable. Vibration source 302 can be drilling rig equipment 206 during a drilling operation. Once fiber optic cable 304 is stretched due to the passage of the seismic waves originated from the vibration of drilling rig equipment 206 during a drilling operation, part of the laser pulses in fiber optic cable 304 backscatters to processing box 308 with different phase and amplitude information.

At 106, multiple backscattered laser pulses from the DAS cable are received by the interrogator. The phase and amplitude differences in the multiple backscattered laser pulses are converted to seismic signals using interferometry, and a collection of acoustic traces that record the strain or strain-rate information derived from the seismic signals is output from processing box 308 of DAS interrogation box 310. The collection of seismic traces is called a gather. The acoustic traces in the gather are also called seismic traces.

Figure 4:
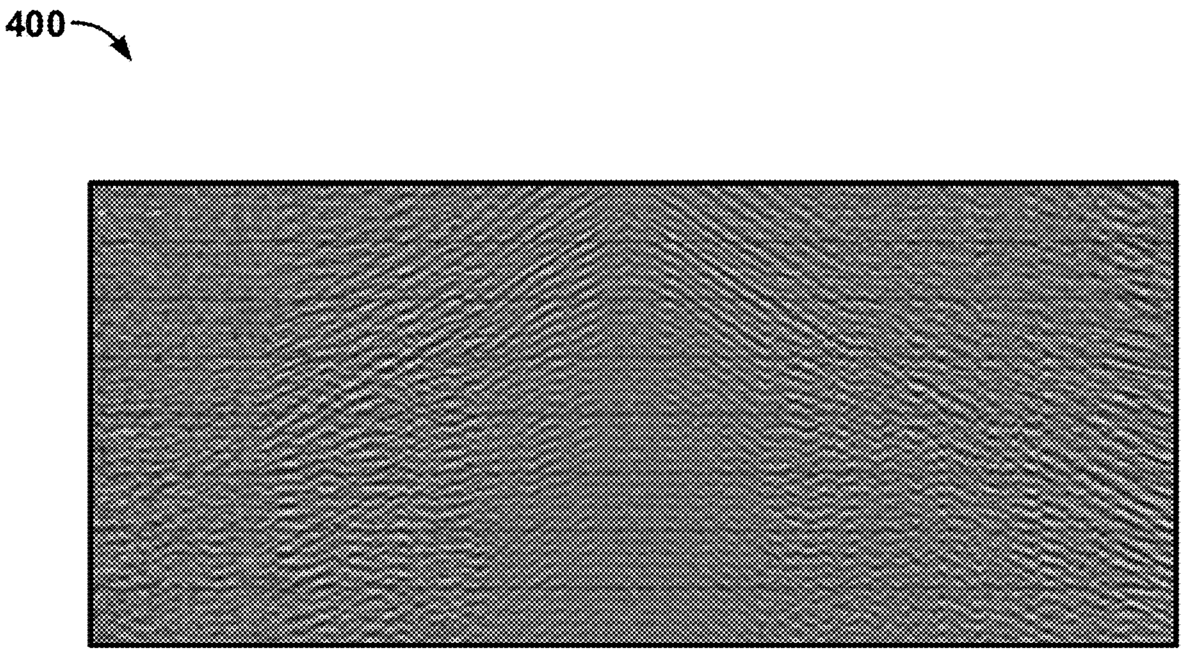
FIG. 4 illustrates an example of a gather of seismic traces.

FIG. 4 illustrates an example 400 of a gather of seismic traces. The horizontal axis can represent the offset of a receiver station, for example, a point of DAS cable 204, from drilling rig 208. The vertical axis can represent time. The gather can be generated from the output of interrogator 202 connected to DAS cable 204 that is laid out with a spiral configuration around drilling rig 208 and its associated drilling rig equipment 206. The gather in FIG. 4 shows linear events emanated from drilling rig 208 to DAS cable 204 as a function of offset. The linear events are represented by the lines in FIG. 4 with each having a shape of a cone in the middle of FIG. 4, for example, lines with one side having positive slope and the other side having negative slope in FIG. 4. These linear events correspond to surface waves backscattered from the subsurface. Velocity can be estimated and changes in velocity that may correspond to sub-surface hazards around the drilling rig can be recognized based on these linear events.

Figure 5:
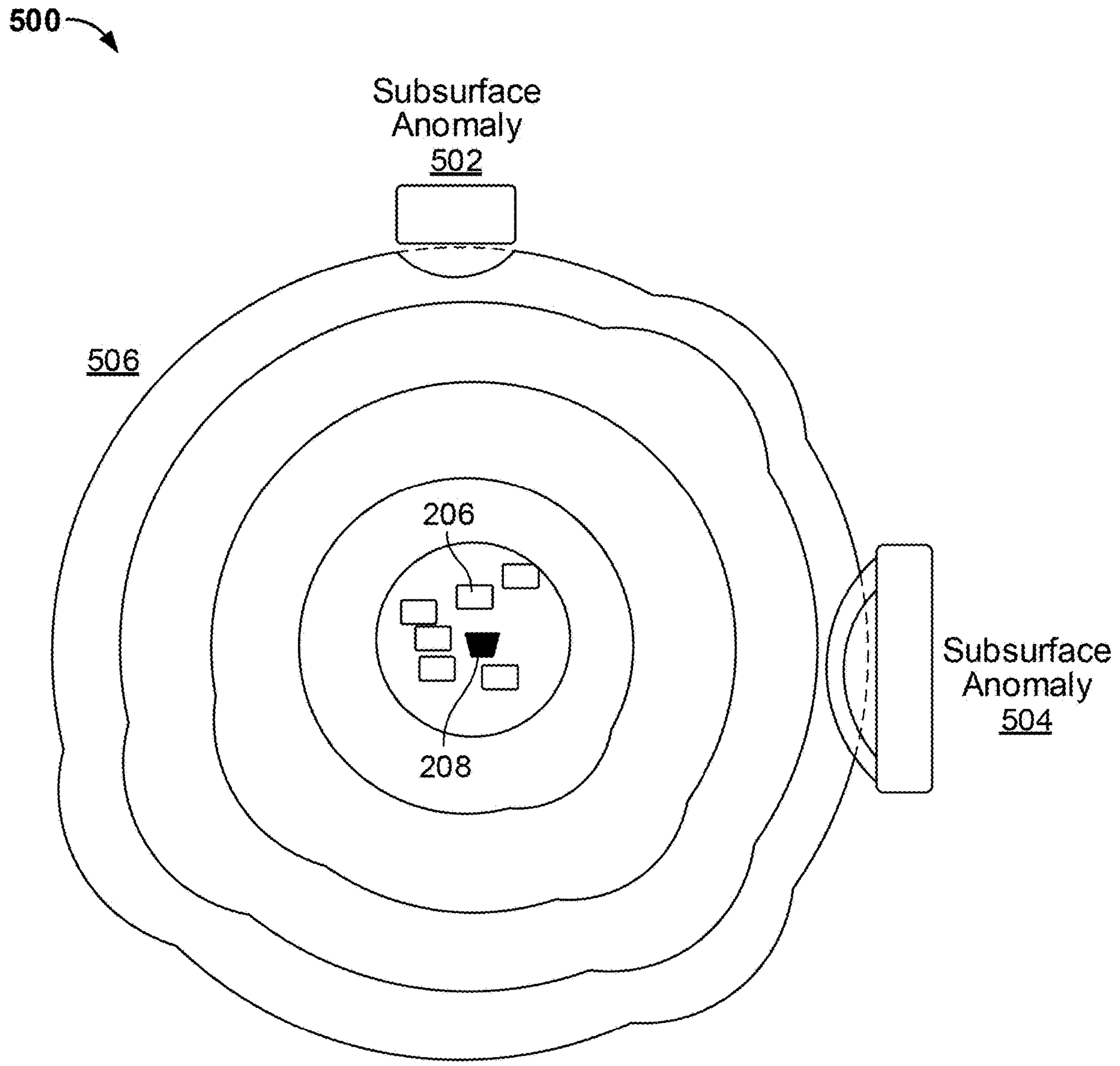
FIG. 5 illustrates an example of surface wave propagation in a subsurface.

FIG. 5 illustrates an example 500 of surface wave propagation in a subsurface. The seismic energy emitted by drilling rig equipment 206 during drilling operations travels as the ring-shaped waves in FIG. 5. The irregular arcs in the ring-shaped waves, other than those next to subsurface anomalies 502 and 504, correspond to waves distortions. The arcs next to the two subsurface anomalies 502 and 504 correspond to backscattered waves as a result of traveling into subsurface anomalies 502 and 504. The dashed arcs illustrates the waves that did not backscatter but is travelling through anomalies 502 and 504. The multiple backscattered laser pulses from DAS cable 204 capture all the waves described in FIG. 5 as a result of the strain in DAS cable 204 that is caused by these waves.

At 108, a respective location of each of one or more anomalies in sub-terrain around the drilling rig is determined based on the multiple backscattered laser pulses. In some implementations, the backscattered waves due to sub-terrain anomalies can be detected in the frequency-wavenumber (FK) domain of multi-offset gather at each azimuth. In the FK domain, left-travelling and right-travelling waves can be distinguished. Once the opposite traveling wave is detected, it can emanate from the anomaly position as if it is a secondary energy source.

In some implementations, a GPS synchronized top-drive sensor installed at drilling rig 208 can record the vibrations through the drilling strings as the drill bit is operating to obtain a pilot trace with the drilling rig equipment generated vibration's signature. The pilot trace can be used to decode the data acquired by DAS cable 204 with spiral orientation, for example, the gather of seismic traces shown in FIG. 4.

In some implementations, the gather from the output of interrogator 202 can be used to generate a velocity profile of the sub-terrain section using multichannel analysis of surface waves (MASW). MASW utilizes multichannel field records or shot gathers to extract dispersion curves. Each shot gather can result in one dispersion curve which is picked and inverted to construct a one-dimensional (1D) velocity profile of the S-wave. The spiral orientation of the DAS cable around the drilling rig can provide azimuthal and offset-dependent velocity information, as the gathers are sorted in offset to drilling rig 208 for each azimuth.

Figure 6:
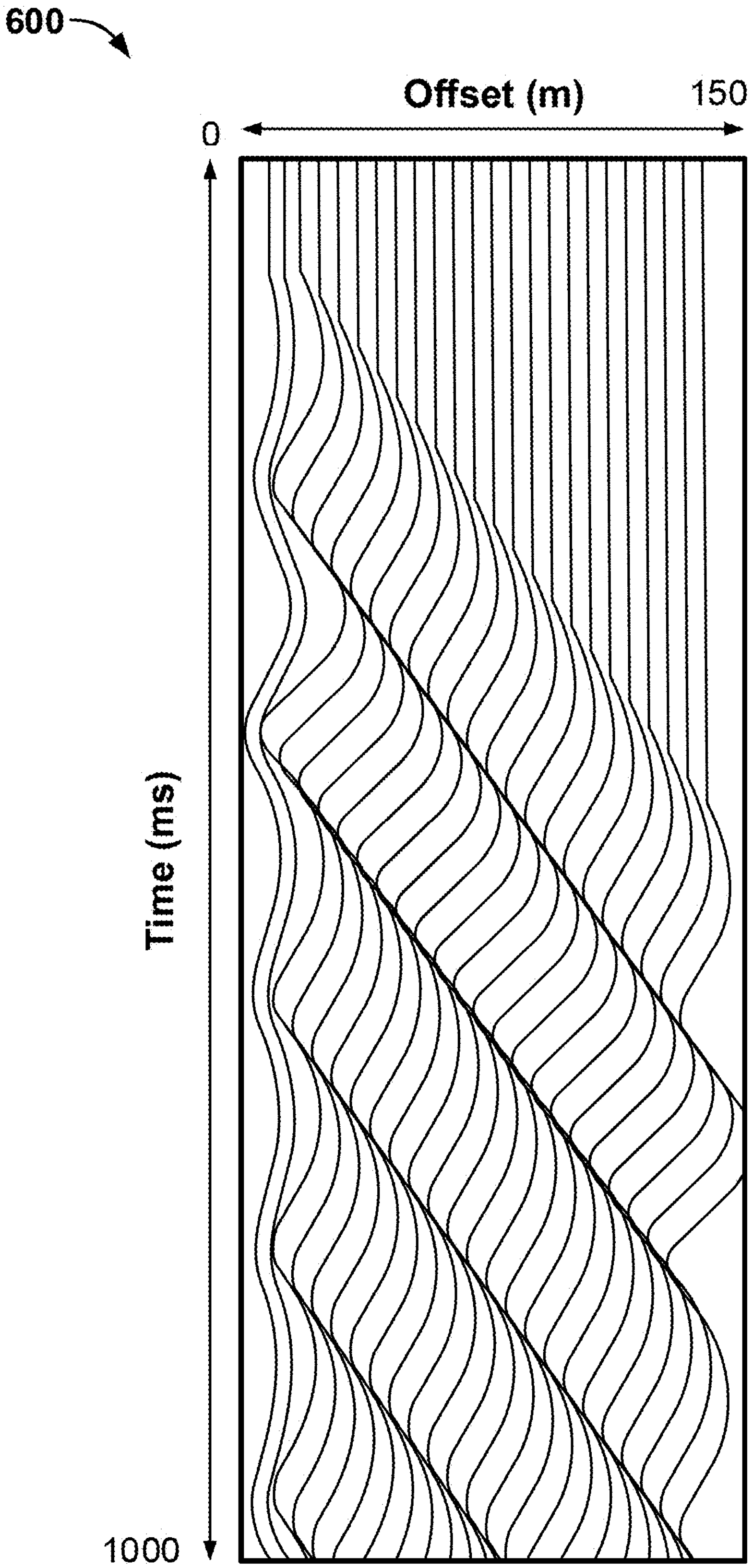
FIG. 6 illustrates an example of a common shot gather.

FIG. 6 illustrates an example 600 of a common shot gather. It can be generated by interrogator 202 after DAS cable 204 is interrogated by DFOS laser pulses from interrogator 202. It can correspond to a specific azimuth and offset of a point of DAS cable 204 from drilling rig 208 based on the spiral configuration of DAS cable 204. FIG. 6 shows surface waves traveling away from drilling rig 208, starting at 0 m offset. Since the surface waves encounter no sub-terrain anomalies, there is no backscattered energy shown in FIG. 6. Additionally, the linear rig-generated noise is arriving at later times as it goes further away from drilling rig 208.

Figure 7:
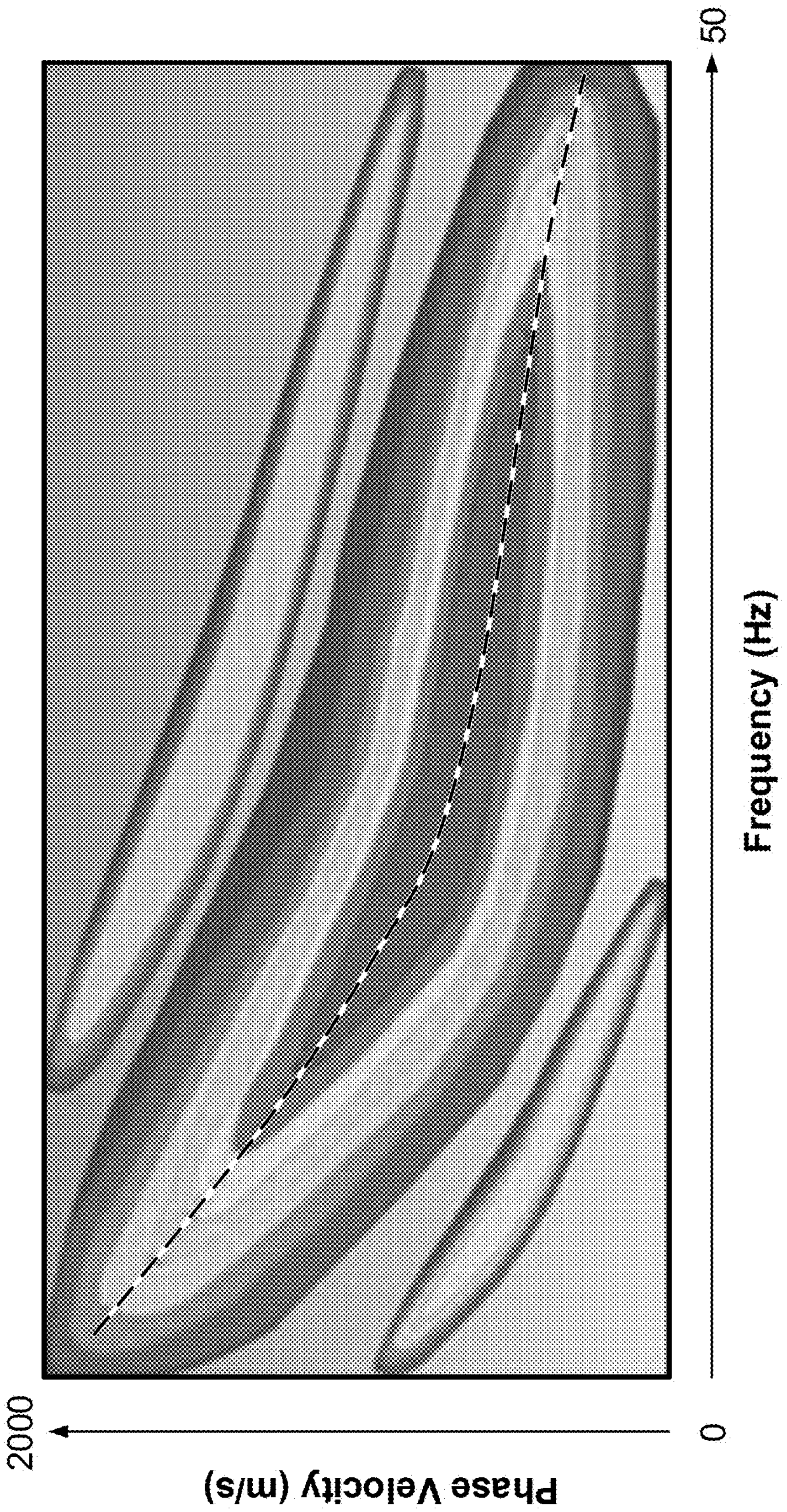
FIG. 7 illustrates an example 700 of a dispersion curve obtained from a single shot gather using multichannel analysis of surface waves (MASW).

FIG. 7 illustrates an example 700 of a dispersion curve obtained from a single shot gather using MASW. The dashed line represents velocity picking of the fundamental mode surface waves.

Figure 8:
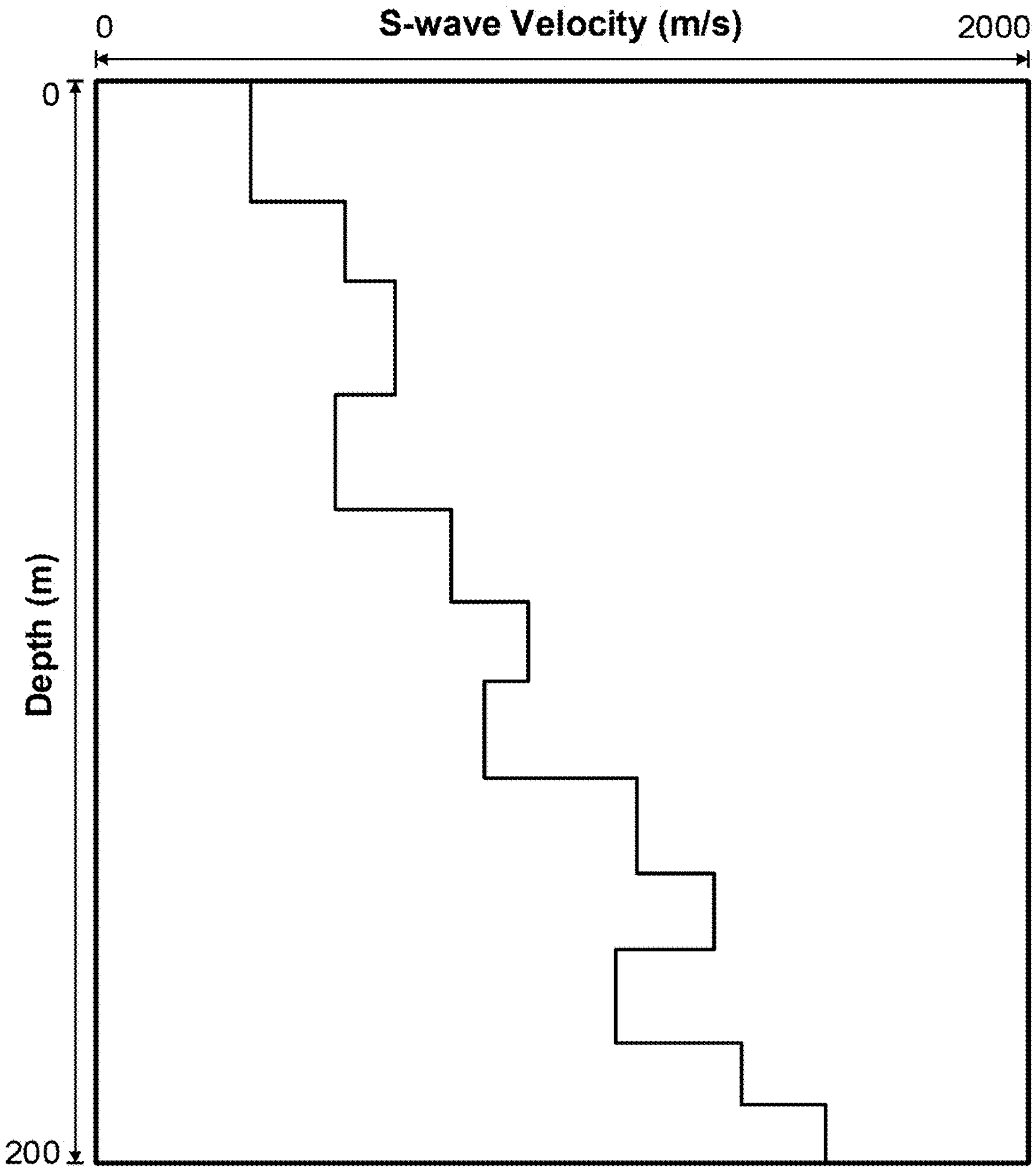
FIG. 8 illustrates an example of a one-dimensional (1D) velocity profile of an S-wave

FIG. 8 illustrates an example 800 of a 1D velocity profile of an S-wave. The 1D velocity profile can be constructed after a dispersion curve is picked and inverted. The 1D velocity profile represents the vertical variations of the S-wave velocity with depth.

Figure 9:
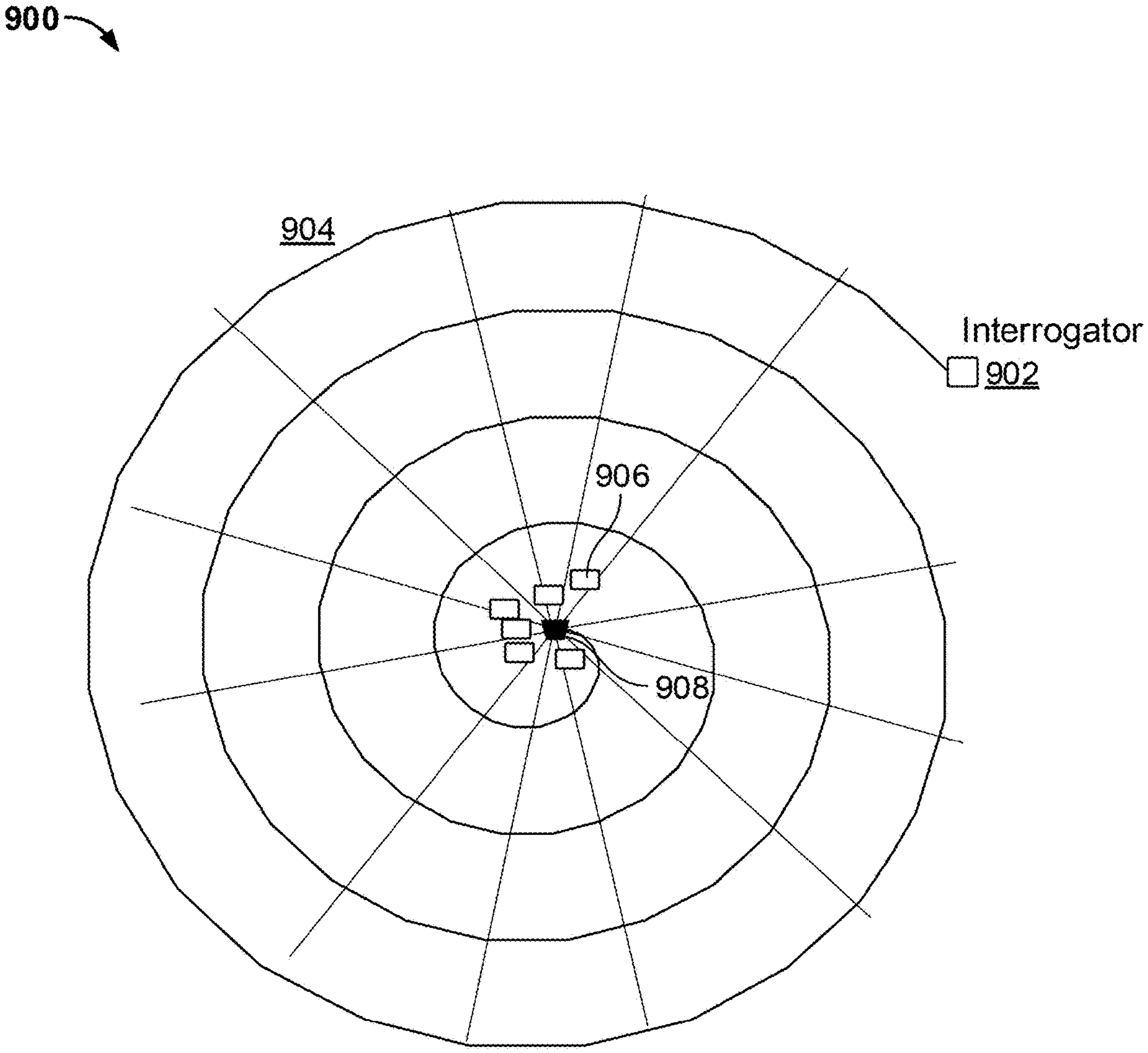
FIG. 9 illustrates an example of another acquisition geometry of a DAS cable for near-surface characterization through passive monitoring of rig-generated noise.

FIG. 9 illustrates an example 900 of another configuration of a DAS cable for near-surface characterization through passive monitoring of rig-generated noise. DAS cable 904 can include both the spiral configuration portion and the star shape portion. The star shape portion of DAS cable 904 can be positioned such that this portion starts from drilling rig 908 and moves farther away from drilling rig 908 along one of the radial paths in FIG. 9 until the end of that radial path, and then moves along the same radial path back to drilling rig 908. This process can be repeated for the remaining radial paths in FIG. 9 until the star shape portion of DAS cable 904 is obtained. In another example, the star shape portion of DAS cable 904 can be positioned such that this portion starts from one end of one of the radial paths, where the end is away from drilling rig 908, and moves towards drilling rig 908 along the radial path. Then this start shape portion moves farther away from drilling rig 908 along each of the remaining radial paths in FIG. 9 until the end of that radial path, and then moves along that radial path back to drilling rig 908. In some implementations, an interrogator 902 can be connected to DAS cable 904.

Figure 10:
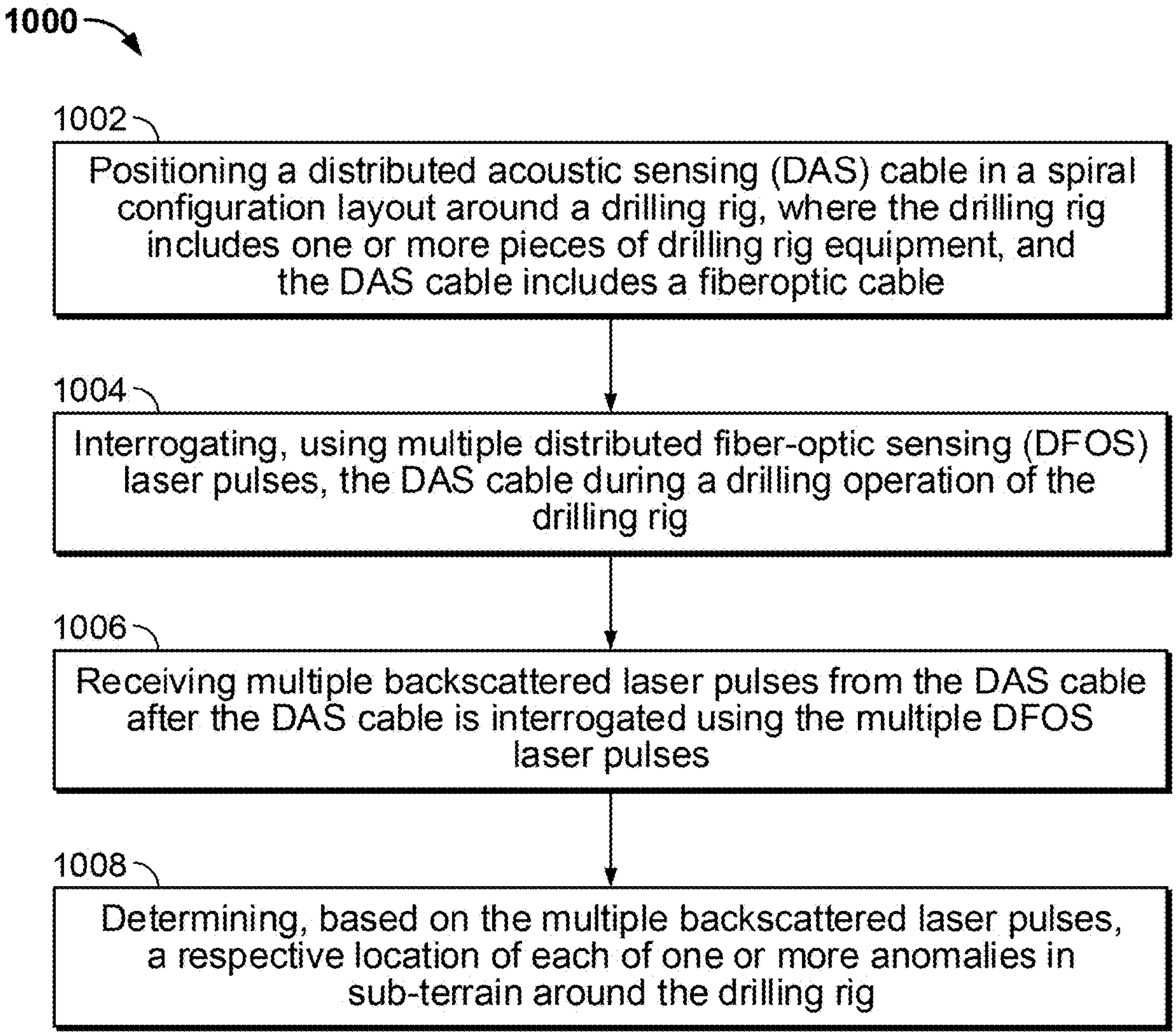
FIG. 10 illustrates an example process of near-surface characterization through passive monitoring of rig-generated noise.

FIG. 10 illustrates an example process 1000 of near-surface characterization through passive monitoring of rig-generated noise. At 1002, a distributed acoustic sensing (DAS) cable in a spiral configuration layout is positioned around a drilling rig, where the drilling rig includes one or more pieces of drilling rig equipment, and the DAS cable includes a fiber-optic cable.

At 1004, the DAS cable is interrogated using multiple distributed fiber-optic sensing (DFOS) laser pulses during a drilling operation of the drilling rig.

At 1006, multiple backscattered laser pulses from the DAS cable are received after the DAS cable is interrogated using the multiple DFOS laser pulses.

At 1008, a respective location of each of one or more anomalies in sub-terrain around the drilling rig is determined based on the multiple backscattered laser pulses.

Figure 11:
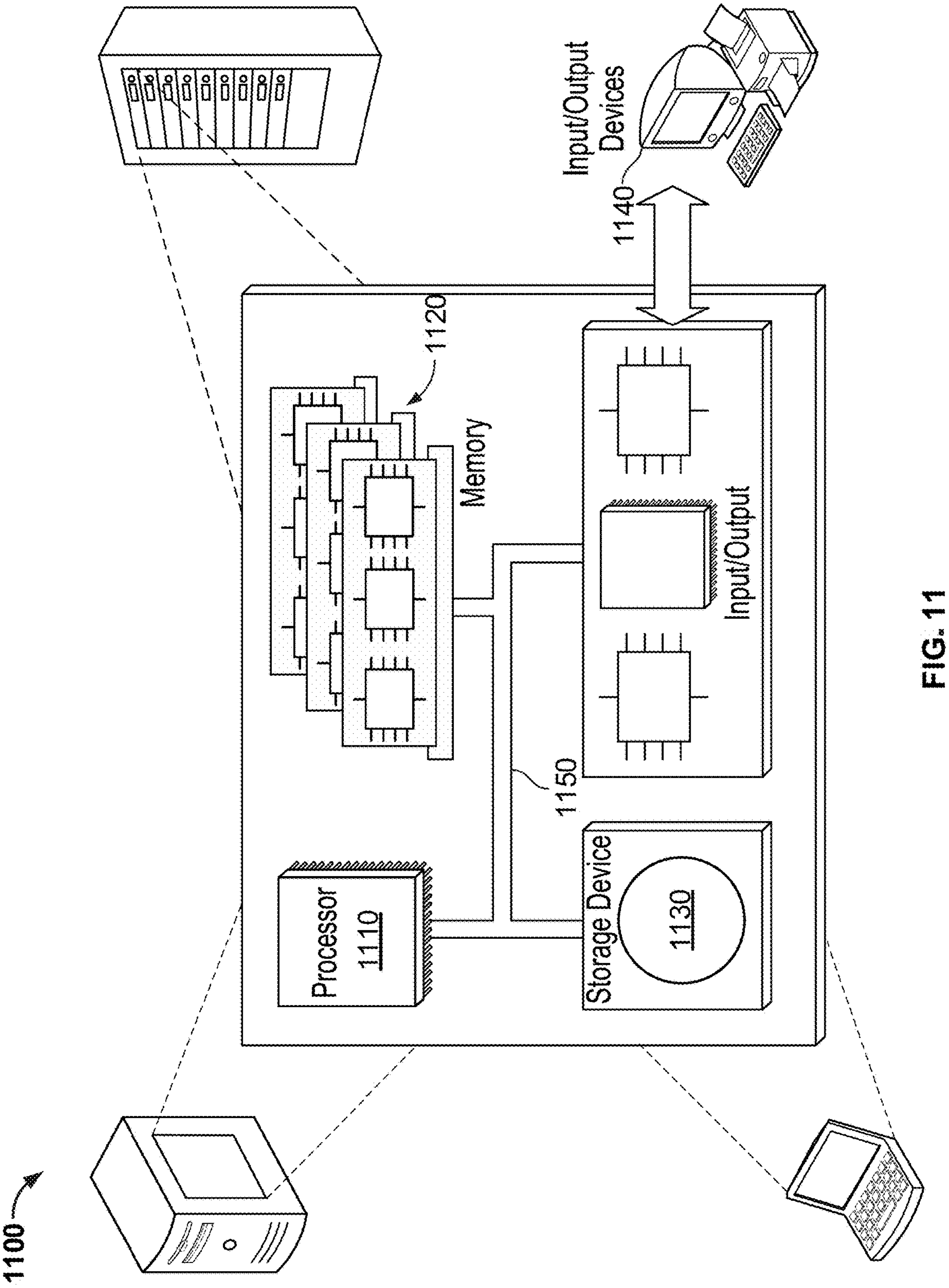
FIG. 11 is a schematic illustration of example computer systems that can be used to execute implementations of the present disclosure.

FIG. 11 illustrates a schematic diagram of an example computing system 1100. The system 1100 can be used for the operations described in association with the implementations described herein. For example, the computing system 1100 may be connected to interrogator 202 in FIG. 2. The computing system 1100 includes a processor 1110, a memory 1120, a storage device 1130, and an input/output device 1140. The components 1110, 1120, 1130, and 1140 are interconnected using a system bus 1150. The processor 1110 is capable of processing instructions for execution within the computing system 1100. In some implementations, the processor 1110 is a single-threaded processor. The processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In some implementations, the memory 1120 is a computer-readable medium. The memory 1120 can be a non-volatile memory unit. The storage device 1130 is capable of providing mass storage for the system 1100. The storage device 1130 is a computer-readable medium. The storage device 1130 may be a floppy disk device, a hard disk device, an optical disk device, or a tape device. The input/output device 1140 provides input/output operations for the system 1100. The input/output device 1140 includes a keyboard and/or pointing device. The input/output device 1140 includes a display unit for displaying graphical user interfaces.

Certain aspects of the subject matter described here can be implemented as a method. A distributed acoustic sensing (DAS) cable is positioned in a spiral configuration layout around a drilling rig, where the drilling rig includes one or more pieces of drilling rig equipment, and the DAS cable includes a fiber-optic cable. The DAS cable is interrogated using multiple distributed fiber-optic sensing (DFOS) laser pulses during a drilling operation of the drilling rig. Multiple backscattered laser pulses are received from the DAS cable after the DAS cable is interrogated using the multiple DFOS laser pulses. A respective location of each of one or more anomalies in sub-terrain around the drilling rig is determined based on the multiple backscattered laser pulses.

Methods can include one or more of the following features.

In some implementations, determining the respective location of each of the one or more anomalies in the sub-terrain around the drilling rig includes determining, based on the multiple backscattered laser pulses, one or more gathers of seismic traces, and determining, based on the one or more gathers of seismic traces and using frequency-wavenumber (F-K) analysis, the respective location of each of the one or more anomalies.

In some implementations, a one-dimensional (1D) velocity profile of the sub-terrain around the drilling rig is constructed based on the one or more gathers.

In some implementations, constructing the 1D velocity profile includes obtaining a dispersion curve from one of the one or more gathers using multichannel analysis of surface waves (MASW).

In some implementations, determining the one or more gathers includes decoding the one or more gathers using a pilot trace from a top-drive sensor at the drilling rig, where the pilot trace includes a signal representing characteristics of vibration of the one or more pieces of drilling rig equipment during the drilling operation.

In some implementations, the respective location includes a respective azimuth and offset of each of the one or more anomalies, and the respective offset is with respect to the drilling rig.

In some implementations, the one or more pieces of drilling rig equipment include at least one of a generator, a mud pump, or a shale shaker.

In some implementations, interrogating the DAS cable includes interrogating the DAS cable using an interrogator connected to the DAS cable, where the multiple DFOS laser pulses are from the interrogator.

In some implementations, the one or more anomalies in the sub-terrain around the drilling rig include at least one of karst, cavity, or fault.

In some implementations, positioning the DAS cable in the spiral configuration layout around the drilling rig includes positioning the DAS cable in the spiral configuration layout around the drilling rig and in a star shape configuration layout, and the star shape configuration layout includes multiple radial paths that intersect at the drilling rig.

Certain aspects of the subject matter described here can be implemented as a system. The system includes a distributed acoustic sensing (DAS) cable and a control system. The DAS cable is positioned in a spiral configuration layout around a drilling rig, where the drilling rig includes one or more pieces of drilling rig equipment, and the DAS cable includes a fiber-optic cable. The control system is communicably coupled to the DAS cable and configured to perform operations including interrogating, using multiple distributed fiber-optic sensing (DFOS) laser pulses, the DAS cable during a drilling operation of the drilling rig; receiving multiple backscattered laser pulses from the DAS cable after the DAS cable is interrogated using the multiple DFOS laser pulses; and determining, based on the multiple backscattered laser pulses, a respective location of each of one or more anomalies in sub-terrain around the drilling rig.

Systems can include one or more of the following features.

In some implementations, determining the respective location of each of the one or more anomalies in the sub-terrain around the drilling rig includes determining, based on the multiple backscattered laser pulses, one or more gathers of seismic traces, and determining, based on the one or more gathers of seismic traces and using frequency-wavenumber (F-K) analysis, the respective location of each of the one or more anomalies.

In some implementations, a one-dimensional (1D) velocity profile of the sub-terrain around the drilling rig is constructed based on the one or more gathers.

In some implementations, constructing the 1D velocity profile includes obtaining a dispersion curve from one of the one or more gathers using multichannel analysis of surface waves (MASW).

In some implementations, determining the one or more gathers includes decoding the one or more gathers using a pilot trace from a top-drive sensor at the drilling rig, where the pilot trace includes a signal representing characteristics of vibration of the one or more pieces of drilling rig equipment during the drilling operation.

In some implementations, the respective location includes a respective azimuth and offset of each of the one or more anomalies, and the respective offset is with respect to the drilling rig.

In some implementations, the one or more pieces of drilling rig equipment include at least one of a generator, a mud pump, or a shale shaker.

In some implementations, interrogating the DAS cable includes interrogating the DAS cable using an interrogator connected to the DAS cable, where the multiple DFOS laser pulses are from the interrogator.

In some implementations, the one or more anomalies in the sub-terrain around the drilling rig include at least one of karst, cavity, or fault.

In some implementations, the DAS cable is positioned in the spiral configuration layout around the drilling rig and in a star shape configuration layout, and the star shape configuration layout includes multiple radial paths that intersect at the drilling rig.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A method, comprising:

positioning a distributed acoustic sensing (DAS) cable in a spiral configuration layout around a drilling rig, wherein the drilling rig comprises one or more pieces of drilling rig equipment, and the DAS cable comprises a fiber-optic cable;

interrogating, using a plurality of distributed fiber-optic sensing (DFOS) laser pulses, the DAS cable during a drilling operation of the drilling rig;

receiving a plurality of backscattered laser pulses from the DAS cable after the DAS cable is interrogated using the plurality of DFOS laser pulses; and determining, based on the plurality of backscattered laser pulses, a respective location of each of one or more anomalies in sub-terrain around the drilling rig, the determining comprising:

determining, based on the plurality of backscattered laser pulses, one or more gathers of seismic traces; and determining, based on the one or more gathers of seismic traces and using frequency-wavenumber (F-K) analysis, the respective location of each of the one or more anomalies.

2. The method of claim 1, wherein the method further comprises:

constructing, based on the one or more gathers, a one-dimensional (1D) velocity profile of the sub-terrain around the drilling rig.

3. The method of claim 2, wherein constructing the 1D velocity profile comprises obtaining a dispersion curve from one of the one or more gathers using multichannel analysis of surface waves (MASW).

4. The method of claim 1, wherein determining the one or more gathers comprises decoding the one or more gathers using a pilot trace from a top-drive sensor at the drilling rig, and wherein the pilot trace comprises a signal representing characteristics of vibration of the one or more pieces of drilling rig equipment during the drilling operation.

5. The method of claim 1, wherein the respective location comprises a respective azimuth and offset of each of the one or more anomalies, and the respective offset is with respect to the drilling rig.

6. The method of claim 1, wherein the one or more pieces of drilling rig equipment comprise at least one of a generator, a mud pump, or a shale shaker.

7. The method of claim 1, wherein interrogating the DAS cable comprises interrogating the DAS cable using an interrogator connected to the DAS cable, and wherein the plurality of DFOS laser pulses are from the interrogator.

8. The method of claim 1, wherein the one or more anomalies in the sub-terrain around the drilling rig comprise at least one of karst, cavity, or fault.

9. The method of claim 1, wherein positioning the DAS cable in the spiral configuration layout around the drilling rig comprises positioning the DAS cable in the spiral configuration layout around the drilling rig and in a star shape configuration layout, and the star shape configuration layout comprises a plurality of radial paths that intersect at the drilling rig.

10. A system, comprising:

a distributed acoustic sensing (DAS) cable positioned in a spiral configuration layout around a drilling rig, wherein the drilling rig comprises one or more pieces of drilling rig equipment, and the DAS cable comprises a fiber-optic cable; and a control system communicably coupled to the DAS cable and configured to perform operations comprising:

interrogating, using a plurality of distributed fiber-optic sensing (DFOS) laser pulses, the DAS cable during a drilling operation of the drilling rig;

receiving a plurality of backscattered laser pulses from the DAS cable after the DAS cable is interrogated using the plurality of DFOS laser pulses; and determining, based on the plurality of backscattered laser pulses, a respective location of each of one or more anomalies in sub-terrain around the drilling rig, the determining comprising:

determining, based on the plurality of backscattered laser pulses, one or more gathers of seismic traces; and determining, based on the one or more gathers of seismic traces and using frequency-wavenumber (F-K) analysis, the respective location of each of the one or more anomalies.

11. The system of claim 10, wherein the operations further comprise:

constructing, based on the one or more gathers, a one-dimensional (1D) velocity profile of the sub-terrain around the drilling rig.

12. The system of claim 11, wherein constructing the 1D velocity profile comprises obtaining a dispersion curve from one of the one or more gathers using multichannel analysis of surface waves (MASW).

13. The system of claim 10, wherein determining the one or more gathers comprises decoding the one or more gathers using a pilot trace from a top-drive sensor at the drilling rig, and wherein the pilot trace comprises a signal representing characteristics of vibration of the one or more pieces of drilling rig equipment during the drilling operation.

14. The system of claim 10, wherein the respective location comprises a respective azimuth and offset of each of the one or more anomalies, and the respective offset is with respect to the drilling rig.

15. The system of claim 10, wherein the one or more pieces of drilling rig equipment comprise at least one of a generator, a mud pump, or a shale shaker.

16. The system of claim 10, wherein interrogating the DAS cable comprises interrogating the DAS cable using an interrogator connected to the DAS cable, and wherein the plurality of DFOS laser pulses are from the interrogator.

17. The system of claim 10, wherein the one or more anomalies in the sub-terrain around the drilling rig comprise at least one of karst, cavity, or fault.

18. The system of claim 10, wherein the DAS cable is positioned in the spiral configuration layout around the drilling rig and in a star shape configuration layout, and the star shape configuration layout comprises a plurality of radial paths that intersect at the drilling rig.

19. A method, comprising:

positioning a distributed acoustic sensing (DAS) cable in a spiral configuration layout around a drilling rig, wherein the drilling rig comprises one or more pieces of drilling rig equipment, and the DAS cable comprises a fiber-optic cable;

interrogating, using a plurality of distributed fiber-optic sensing (DFOS) laser pulses, the DAS cable during a drilling operation of the drilling rig;

receiving a plurality of backscattered laser pulses from the DAS cable after the DAS cable is interrogated using the plurality of DFOS laser pulses; and determining, based on the plurality of backscattered laser pulses, a respective location of each of one or more anomalies in sub-terrain around the drilling rig, the respective location comprising a respective azimuth and offset of each of the one or more anomalies, and the respective offset is with respect to the drilling rig.

20. A method, comprising:

positioning a distributed acoustic sensing (DAS) cable in a spiral configuration layout around a drilling rig, the positioning comprising positioning the DAS cable in the spiral configuration layout around the drilling rig and in a star shape configuration layout, and the star shape configuration layout comprises a plurality of radial paths that intersect at the drilling rig, wherein the drilling rig comprises one or more pieces of drilling rig equipment, and the DAS cable comprises a fiber-optic cable;

interrogating, using a plurality of distributed fiber-optic sensing (DFOS) laser pulses, the DAS cable during a drilling operation of the drilling rig;

receiving a plurality of backscattered laser pulses from the DAS cable after the DAS cable is interrogated using the plurality of DFOS laser pulses; and determining, based on the plurality of backscattered laser pulses, a respective location of each of one or more anomalies in sub-terrain around the drilling rig.

21. A system, comprising:

a distributed acoustic sensing (DAS) cable positioned in a spiral configuration layout around a drilling rig, wherein the drilling rig comprises one or more pieces of drilling rig equipment, and the DAS cable comprises a fiber-optic cable; and a control system communicably coupled to the DAS cable and configured to perform operations comprising:

interrogating, using a plurality of distributed fiber-optic sensing (DFOS) laser pulses, the DAS cable during a drilling operation of the drilling rig;

receiving a plurality of backscattered laser pulses from the DAS cable after the DAS cable is interrogated using the plurality of DFOS laser pulses; and determining, based on the plurality of backscattered laser pulses, a respective location of each of one or more anomalies in sub-terrain around the drilling rig, the respective location comprising a respective azimuth and offset of each of the one or more anomalies, and the respective offset is with respect to the drilling rig.

22. A system, comprising:

a distributed acoustic sensing (DAS) cable positioned in a spiral configuration layout around a drilling rig, the DAS cable being positioned in the spiral configuration layout around the drilling rig and in a star shape configuration layout, and the star shape configuration layout comprises a plurality of radial paths that intersect at the drilling rig, wherein the drilling rig comprises one or more pieces of drilling rig equipment, and the DAS cable comprises a fiber-optic cable; and a control system communicably coupled to the DAS cable and configured to perform operations comprising:

interrogating, using a plurality of distributed fiber-optic sensing (DFOS) laser pulses, the DAS cable during a drilling operation of the drilling rig;

receiving a plurality of backscattered laser pulses from the DAS cable after the DAS cable is interrogated using the plurality of DFOS laser pulses; and determining, based on the plurality of backscattered laser pulses, a respective location of each of one or more anomalies in sub-terrain around the drilling rig.

* * * * *